United States Patent [19]

Crum et al.

[11] 4,383,567
[45] May 17, 1983

[54] PNEUMATIC TRACTOR TIRE

[75] Inventors: George T. Crum, Uniontown; Charles D. Guster, Jr., Massillon; Myron M. McClain, North Canton, all of Ohio

[73] Assignee: The Goodyear Tire & Rubber Company, Akron, Ohio

[21] Appl. No.: 346,356

[22] Filed: Feb. 5, 1982

[51] Int. Cl.³ .............................................. B60C 11/08
[52] U.S. Cl. ................................ 152/209 B; D12/149
[58] Field of Search .......... 152/209 R, 209 A, 209 B, 152/209 NT, 209 WT, 209 D; D12/136, 140, 146–147, 148–151

[56] References Cited

U.S. PATENT DOCUMENTS

| | | | |
|---|---|---|---|
| D. 265,307 | 7/1982 | Maeda et al. | D12/149 |
| 2,415,290 | 2/1947 | Kreyer | 152/209 B |
| 2,571,922 | 10/1951 | Morrison | 152/209 B |
| 3,587,703 | 6/1971 | Hanus | 152/209 B |
| 3,603,370 | 9/1971 | Hylbert et al. | 152/209 B |
| 4,186,788 | 3/1980 | Pommier | 152/209 B |
| 4,217,943 | 8/1980 | Tsuzura | 152/209 B |

Primary Examiner—Edward C. Kimlin
Assistant Examiner—Lois E. Boland
Attorney, Agent, or Firm—L. R. Drayer

[57] ABSTRACT

A pneumatic tire for tractors and like vehicles has a tread with alternating long and short lugs extending axially inward from each lateral edge of the tread. Each long lug has three portions and each short lug has two portions. The distances between the lugs provides an open design in the general area of the mid-circumferential centerplane.

The foregoing abstract is not to be taken as limiting the invention of this application, and in order to understand the full nature and extent of the technical disclosure of this application, reference must be made to the accompanying drawings and the following detailed description.

8 Claims, 4 Drawing Figures

PNEUMATIC TRACTOR TIRE

BACKGROUND OF THE INVENTION

This invention relates to pneumatic tractor tires designed for use on the drive axle positions of farm tractors and like vehicles.

The trend to consolidate separate smaller parcels of land into larger farming operations has necessitated the driving of farm tractors over the hard surface roadways connecting the separate parcels on a regular basis. Such operating conditions make the ride characteristics of tractor tires an important design consideration, along with the draw-bar traction characteristics required for operating the tractor in a field where the soil composition often presents a serious traction problem.

It is well known in the tire designing technology that design features aimed primarily at providing the high draw-bar traction characteristics needed with a tractor tire is operated in a field may result in less than desirable ride comfort characteristics when the same tractor tire is operated on a hard surface roadway, and vice versa. Heretofore, tractor tires produced in an effort to provide the desired operating characteristics for both on and off-the-road use, such as the tires described in U.S. Pat. No. 3,603,370, issued to E. W. Hylbert et al, had to make trade-offs between draw-bar traction and ride performance levels, because it was felt that a design change aimed at improving operating characteristics on hard surfaces necessarily resulted in poorer off-the-road operating characteristics.

It is an object of this invention to provide a pneumatic tire for use on the drive axle positions of a farm tractor, or like vehicle, that has improved ride operating characteristics when operated on a hard surface roadway, without any lessening in draw-bar traction when the tire is operated off the road.

DETAILED DESCRIPTION OF THE INVENTION

Figure 1:
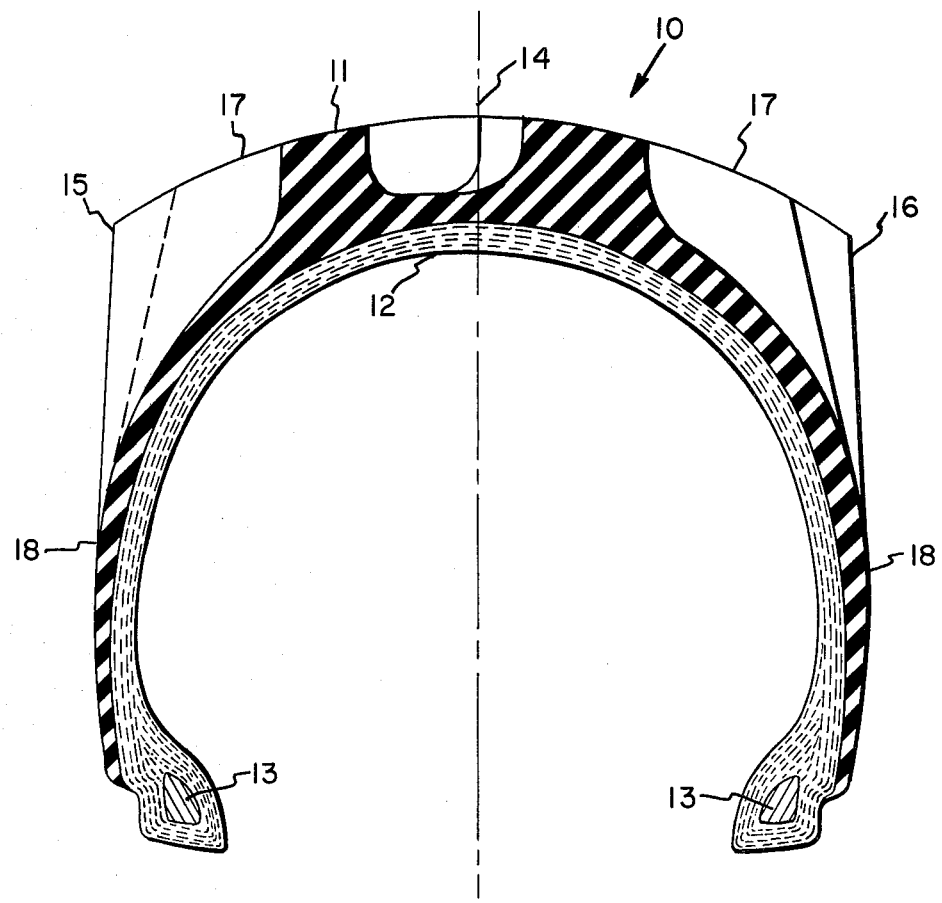
FIG. 1 is a cross-sectional view of a tractor tire constructed in accordance with the invention, taken substantially along line 1—1 of FIG. 3.
Figure 3:
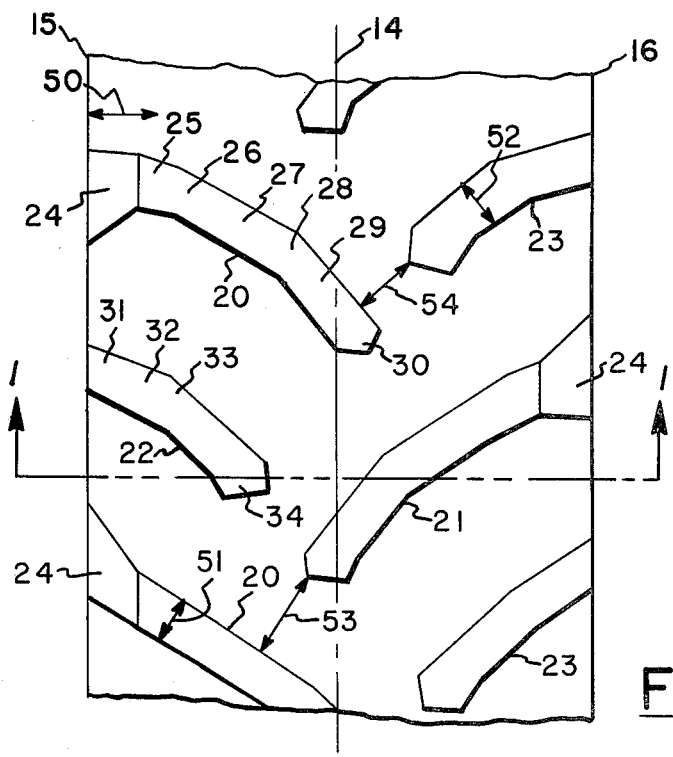
FIG. 3 is a plan view of a section of the tread of the tire of FIG. 2.

With reference to FIG. 1, which is a cross-sectional view taken substantially along line 1—1 of FIG. 3, a tractor tire 10 constructed in accordance with this invention comprises a tread portion 11 overlying a carcass 12, which terminates in beads 13 at its radially inner extremities. The tread 11 comprises several sets of high lugs 17 which have their beginnings at the lateral edges of the tread 15,16, with valleys located between the lugs. Sidewalls 18 extend radially inward from the lateral edges of the tread 15 and 16. For purposes of describing this invention, "axis" and "axially" refer to the axis of rotation of the tire, while "radial" and "radially" refer to planes intersecting the axis of rotation of the tire. As used herein, the mid-circumferential centerplane 14 is a plane which is perpendicular to the axis of rotation of the tire, located midway between the lateral edges of the tread 15,16. As used herein, "axially inward" shall mean a direction that is parallel to the axis of rotation of the tire and going from one of the lateral edges of the tread toward the tire's mid-circumferential centerplane, and "axially outward" shall mean a direction that is opposite of axially inward. As used herein, "radially inward" shall mean a direction going from the tread of the tire toward the axis of rotation of the tire, and "radially outward" shall mean a direction going from the axis of rotation of the tire toward the tread of the tire. The reinforcing components of the carcass 12 may be oriented either radially or at a bias, with respect to the mid-circumferential centerplane 14.

Figure 2:
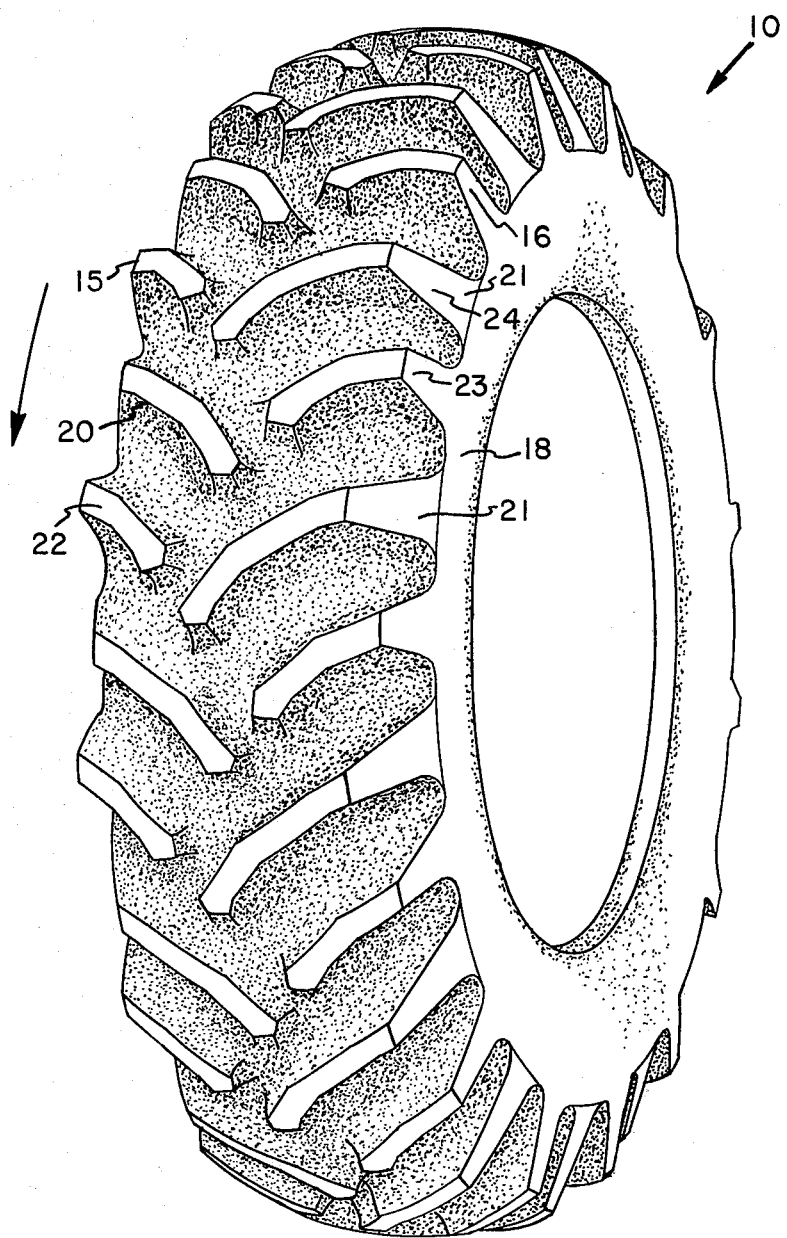
FIG. 2 is a perspective view of a tire constructed in accordance with the preferred embodiment of the invention.

Referring now to FIGS. 2 and 3, which represent the preferred embodiment of the invention, the tread portion 11 of a tractor tire 10 extends circumferentially around the tire and has first and second lateral edges 15,16, with the mid-circumferential centerplane represented by line 14. It should be noted that the tire of this invention has a directional tread, and that there is a normal or preferred direction of rotation of the tire for best overall performance as indicated by the arrow in FIG. 2. For purposes of this invention, "leading" shall mean a part or portion of the tread that contacts the ground first, with respect to a series of such parts or portions, during normal rotation of the tire in the preferred direction, and "lagging" shall mean that portion or part of the tread that contacts the ground last, with respect to a series of such parts or portions. As used herein, the distance between the first lateral edge 15 and the second lateral edge 16 of the tread, measured parallel to the axis of rotation of the tire, is the tread width.

The tread portion 11 of the tire of this invention comprises two sets of long, or primary lugs 20,21 and two sets of short, or secondary lugs 22,23. Each lug of the first set of primary lugs 20 extends axially inward from the first lateral edge of the tread 15. The lugs of the second set of primary lugs 21 extend axially inward from the second lateral edge of the tread 16, and are similar to the lugs of the first set of primary lugs 20, but opposite in hand. The lugs of the first set of secondary lugs 22 have their beginnings located at the first lateral edge of the tread 15, substantially midway between the adjacent leading and lagging lugs of the first set of primary lugs 20, and extend axially inward therefrom. The lugs of the second set of secondary lugs 23 are similar to the lugs of the first set of secondary lugs 22, but opposite in hand, and have their beginnings located at the second lateral edge of the tread 16, substantially midway between the adjacent leading and lagging lugs of the second set of primary lugs 21.

Each primary lug 20,21 has three distinct portions. The junction of a sidewall of the tire 18 with the radially outermost surface of the first portion of each lug of the first set of primary lugs 20, comprises a tapered surface 24. The tapered surface 24 extends axially inward such that the radially outermost surface of the first portion 25 of a primary lug 20 has its beginning located a distance of about 5 to 15 percent of the tread width from the first lateral edge of the tread 15, as measured in a direction parallel to the tire's axis of rotation at 50. The first portion 25 of a primary lug 20 has its beginning at the axially inner edge of the beveled portion 24 and extends to an inner end 26 located between 25 to 35 percent of the axial distance from the first lateral edge 15 to the mid-circumferential centerplane 14 at an angle of between 60 and 74 degrees with respect to the mid-circumferential centerplane 14. As used herein, "axial distance" is measured parallel to the tire's axis of rotation. The second portion 27 of each primary lug 20 begins at the inner end 26 of the first portion 25 and extends axially inward at an angle of between 52 and 60 degrees with respect to the mid-circumferential centerplane 14 to its inner end 28, located between 80 to 90 percent of the axial distance from the first lateral edge 15 to the mid-circumferential centerplane 14. The third portion 29 of each of the primary lugs 20, begins at the inner end 28 of the second portion 27 and extends axially inward at an angle of between 35 and 45 degrees with respect to the mid-circumferential centerplane 14 to at least the mid-circumferential centerplane. The axially inner end 30 of the third portion of each of the primary lugs 20 may be enlarged in ground-engaging area, and is located in the general area of the mid-circumferential centerplane. The radially outermost surface of the first, second, and third portions of each primary lug 20 have a width, measured perpendicular to an edge of the lug, as shown at 51, of between 4 to 14 percent of the tread width.

Each lug 22 of the first set of secondary lugs has two distinct portions. The first portion 31 has its beginning located at the first lateral edge of the tread 15, and extends axially inward to its inner end 32 located about 25 to 35 percent of the axial distance between the first lateral edge 15 and the mid-circumferential centerplane 14 at an angle of between 65 and 80 degrees with respect to the mid-circumferential centerplane. The second portion 33 extends axially inward from the inner end 32 of the first portion 31 to its inner end 34 located about 60 to 72 percent of the axial distance from the first lateral edge 15 to the mid-circumferential centerplane 14, at an angle of between 40 and 60 degrees with respect to the mid-circumferential centerplane. The inner end 34 of the second portion 33 of each secondary lug 22 may be enlarged in ground-engaging area. The radially outermost surface of the first and second portions 31,33 of each secondary lug 22 have a width, measured perpendicular to an edge of the lug, as shown at 52, of between 4 and 14 percent of the tread width.

The lugs of the second set of primary lugs 21 are offset circumferentially of the tire with respect to the next adjacent pair of primary lugs 20, so that the inner end 30 of the third portion 29 of each primary lug is spaced a distance of between 25 and 35 percent of the tread width from the lagging edge of the second portion of a primary lug of the other set of primary lugs, as measured at 53. Put another way, each of the primary lugs 20 and 21 is offset circumferentially of the tire with respect to the next adjacent two primary lugs extending axially inward from the opposite lateral edge of the tread, and each secondary lug 22,23 is offset circumferentially of the tire with respect to the next adjacent two secondary lugs extending axially inward from the opposite lateral edge of the tread. The inner end 34 of the second portion 33 of each secondary lug 22 should be spaced at a distance of about 6 to 25 percent of the tread width from the lagging edge of the third portion 29 of a primary lug extending axially inward from the opposite lateral edge of the tread, as measured at 54.

A segment of the tread of a tire manufactured in accordance with this invention which includes one lug from the first set of primary lugs, one lug from the first set of secondary lugs, one lug from the second set of primary lugs, and one lug from the second set of secondary lugs, is called a "pitch". It is well known in the tire design technology that it is desirable that the number of pitches around the circumference of a tire should be a whole number. In order to optimize the ride characteristics of a tire made in accordance with this invention, while maintaining good draw-bar traction characteristics, it is highly desirable to maintain the open spacing between the lugs that results when the distance relationships and other features of the tread described above are employed in the design of the tire's tread.

A "tractive efficiency test" comparing a tire manufactured in accordance with this invention and a tire such as that described and claimed in U.S. Pat. No. 3,603,370 to a control tire, having an efficiency rating of 100, showed that a tire manufactured in accordance with this invention had an efficiency of 106 in the "84 percent tractive efficiency test" and 104 in the "75 percent tractive efficiency test", while the prior art tire had a rating of 90 in the "84 percent tractive efficiency test" and a rating of 93 in the "75 percent tractive efficiency test". An "84 percent tractive efficiency test" is one that is run under such conditions that a tire which would go a given distance in 100 revolutions with no draw-bar loading, (draw-bar loading being the type of load that a tractor would encounter when pulling a plow), to go the same distance requires 116 revolutions because of slipping between the tire and the ground. A "75 percent tractive efficiency test" has analogous standards. The maintenance of substantially the same draw-bar traction characteristics in a tractor tire manufactured in accordance with this invention, while improving the ride characteristics of the tire as described above, is contrary to the generally accepted view in the tire designing technology that structural changes aimed at providing higher draw-bar traction characteristics can only be obtained at a trade-off for poorer ride level performance.

The tapering of surface 24, which connects the radially outermost surface of the first portion 25 of each primary lug 20,21 to the sidewall 18 helps to reduce the weight of the tire 10 with no resultant loss in product quality or performance. The overall inclination of each lug is in the range of 30 to 40 degrees with respect to the mid-circumferential centerplane 14, and this gives the tire good overall draw-bar traction and cleaning characteristics. However, the various portions of the primary and secondary lugs have angular relationships to each other to provide "angle bracing" and give more rigidity to the lugs during those periods of use when draw-bar traction is the most important operating characteristic of the tire. The location of the beginning of the first portion of the secondary lugs, substantially midway between the adjacent leading and lagging primary lugs, helps to minimize the amplitude of the vibrations generated at the lateral edges of the tread when a tire constructed in accordance with this invention is operated on a hard surface road.

Figure 4:
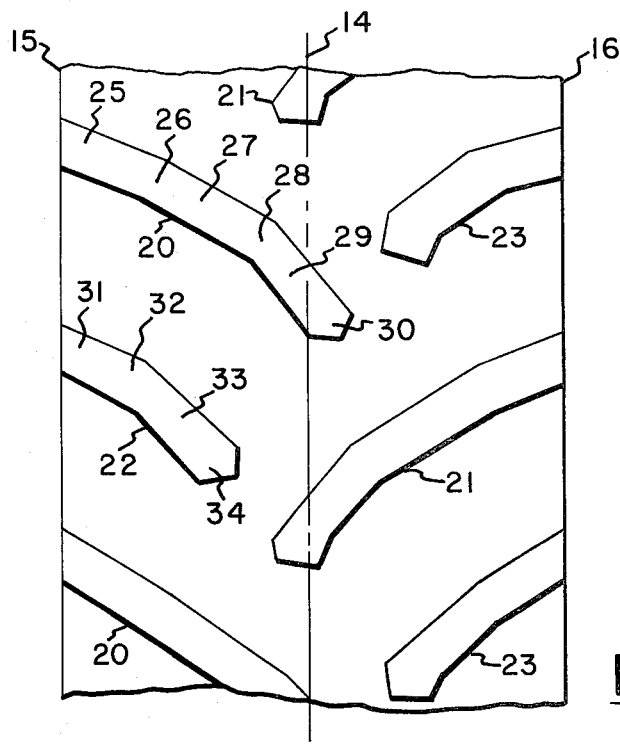
FIG. 4 is a plan view of an alternate embodiment of the tread of a tire, constructed in accordance with the invention.

Referring now to FIG. 4, an alternate embodiment of the invention is illustrated in which the radially outermost surface of the first portion 25 of each primary lug has its beginning located at a lateral edge of the tread 15,16. As can best be seen in FIG. 2, while the tapered portion 24 connecting the sidewalls 18 to the radially outermost surface of the primary lugs 20,21 allows a significant reduction in the amount of material required to produce a tire in accordance with the preferred embodiment of the invention, such a tapered surface is not an essential element of the invention. In the alternate embodiment, each secondary lug 22,23 is substantially the same as those described above in the preferred embodiment.

The decreasing angularity of each portion of the primary lugs 20,21, with respect to the mid-circumferential centerplane 18, provides an optimization of draw-bar traction in soil of varying consistencies.

The decreasing angularity of the first and second portions 30,32 of the secondary lugs 22,23 aids in improved draw-bar traction also, while the arrangement of the secondary lugs with respect to the primary lugs, as described above, helps to optimize ride characteristics when the tire is operated on a hard surface road.

While certain representative embodiments and details have been shown for the purpose of illustrating the invention, it will be apparent to those skilled in the art that various changes and modifications may be made therein without departing from the spirit or scope of the invention.

What is claimed is:

1. A pneumatic tire for tractors and like vehicles, wherein said tire has a tread portion, the improvement in said tread portion comprising:
   (a) two sets of primary lugs, each lug of a first set of primary lugs having first, second, and third portions, said first portion beginning at one lateral edge of the tread and extending to an inner end located about 25 to 35 percent of the axial distance from said lateral edge to the mid-circumferential centerplane of the tire at an angle of between 60 and 74 degrees with respect to said mid-circumferential centerplane, said second portion extending from the inner end of said first portion to an inner end located between 80 to 95 percent of the axial distance from said lateral edge to said mid-circumferential centerplane at an angle of between 52 and 63 degrees with respect to said mid-circumferential centerplane, said third portion extending from the inner end of said second portion to at least said mid-circumferential centerplane at an angle of between 35 and 45 degrees with respect to said mid-circumferential centerplane;
   (i) each lug of the second set of primary lugs being similar to said first set of primary lugs but opposite in hand, having a beginning at the other lateral edge of the tread and being offset circumferentially of said tire with respect to the next adjacent pair of primary lugs in said first set of primary lugs so that the inner end of the third portion of each of said primary lugs is spaced at a distance of between 25 and 35 percent of the tread width from the lagging edge of the second portion of a primary lug of the other set of primary lugs; and
   (b) two sets of secondary lugs, each lug of a first set of secondary lugs having first and second portions, said first portion beginning at the same lateral edge of the tread as the first portions of the lugs of said first set of primary lugs and extending to an inner end located about 25 to 35 percent of the axial distance from said lateral edge to said mid-circumferential centerplane at an angle of between 65 and 80 degrees with respect to said mid-circumferential centerplane, said second portion extending from the inner end of said first portion to an inner end located about 60 to 72 percent of the axial distance from said tread edge to said mid-circumferential centerplane at an angle of between 40 to 60 degrees with respect to said mid-circumferential centerplane and being disposed one only between each adjacent pair of primary lugs in the first set of primary lugs;
   (i) each lug of the second set of secondary lugs being similar to the first set of said secondary lugs, but opposite in hand, and having a beginning at said other lateral edge of the tread.

2. A pneumatic tire as described in claim 1, further characterized in that each said primary lug has a radially outermost surface and the radially outermost surface of each said first portion of each said primary lug has its beginning located at a distance of about 5 to 15 percent of the tread width from said lateral edge.

3. A pneumatic tire as described in claim 1 or 2, further characterized in that the first portion of each of said secondary lugs has its beginning located substantially midway between the adjacent leading and lagging primary lugs.

4. A pneumtic tire as described in claim 3, wherein the width of the radially outermost surface of the first, second, and third portions of each said primary lug and the radially outermost surface of the first and second portions of each of said secondary lugs, measured perpendicular to an edge of the lug, is between 4 to 14 percent of said tire's tread width.

5. A pneumatic tire as described in claim 4, wherein the inner end of the third portion of each of said primary lugs and the inner end of the second portion of each of said secondary lugs is enlarged in ground-engaging area.

6. A pneumatic tire as described in claim 3, wherein the inner end of the second portion of each secondary lug is spaced at a distance in the range of 6 to 25 percent of the tread width from the lagging edge of the third portion of a primary lug extending from the opposite lateral edge of the tread.

7. A pneumatic tire as described in claim 6, wherein the width of the radially outermost surface of the first, second, and third portions of each said primary lug and the radially outermost surface of the first and second portions of each said secondary lug, measured perpendicular to an edge of the lug, is between 4 to 14 percent of said tire's tread width.

8. A pneumatic tire as described in claim 7, wherein the inner end of the third portion of each of said primary lugs and the inner end of the second portion of each of said secondary lugs is enlarged in ground-engaging area.

* * * * *